United States Patent [19]

Forero

[11] Patent Number: 5,556,684
[45] Date of Patent: Sep. 17, 1996

[54] MANUFACTURING PROCESS FOR SYNTHETIC FIBER CARPETS FIXED BY FUSION AT REGULAR INTERVALS WITH CREST OR TUFTS, WITHOUT USING GLUES OR USING SMALL AMOUNTS OF GLUES, WHERE THREADS DO NOT LOOSEN AND THUS OBTAINING THE CARPETS

[76] Inventor: Miguel Forero, Carrera 7, No. 26-20, 21st Floor, Santafe de Bogota D.C., Colombia

[21] Appl. No.: 192,170

[22] Filed: Feb. 4, 1994

[51] Int. Cl.$^6$ ............................. B32B 3/02; D05C 17/00
[52] U.S. Cl. ........................... 428/95; 428/89; 428/93; 428/96; 428/97
[58] Field of Search ................. 428/89, 93, 95, 428/96, 97

[56] References Cited

U.S. PATENT DOCUMENTS

| | | | |
|---|---|---|---|
| 2,988,800 | 6/1961 | White | 428/95 |
| 3,285,797 | 11/1966 | Harrison et al. | 428/95 |
| 3,325,323 | 6/1967 | Forkner | 428/95 |
| 3,847,719 | 11/1974 | Crowley | 428/93 |
| 4,258,094 | 3/1981 | Benedyk | 428/95 |
| 4,379,189 | 4/1983 | Platt | 428/89 |
| 4,389,434 | 6/1983 | Polman | 428/95 |
| 4,439,476 | 3/1984 | Guild | 428/96 |
| 4,668,552 | 5/1987 | Scott | 428/96 |
| 4,699,818 | 10/1987 | Evans et al. | 428/95 |
| 5,240,530 | 8/1993 | Fink | 156/94 |
| 5,370,757 | 12/1994 | Corbin et al. | 156/72 |
| 5,464,677 | 11/1995 | Corbin et al. | 428/95 |
| 5,472,763 | 12/1995 | Schwarz et al. | 428/95 |

FOREIGN PATENT DOCUMENTS 2065683 10/1992 Canada.
WO93/12285 6/1993 WIPO.

*Primary Examiner*—Terrel Morris
*Attorney, Agent, or Firm*—Vaden, Eickenroht & Thompson

[57] ABSTRACT

A tufted carpet comprising a base and a plurality of tufts. Each of the tufts have a looped portion on an underside of the base. The looped portions are fused to the underside of the base and to adjacent looped portions using heat and pressure, thereby forming a homogeneous layer of the looped portions on the underside of the base.

4 Claims, 3 Drawing Sheets

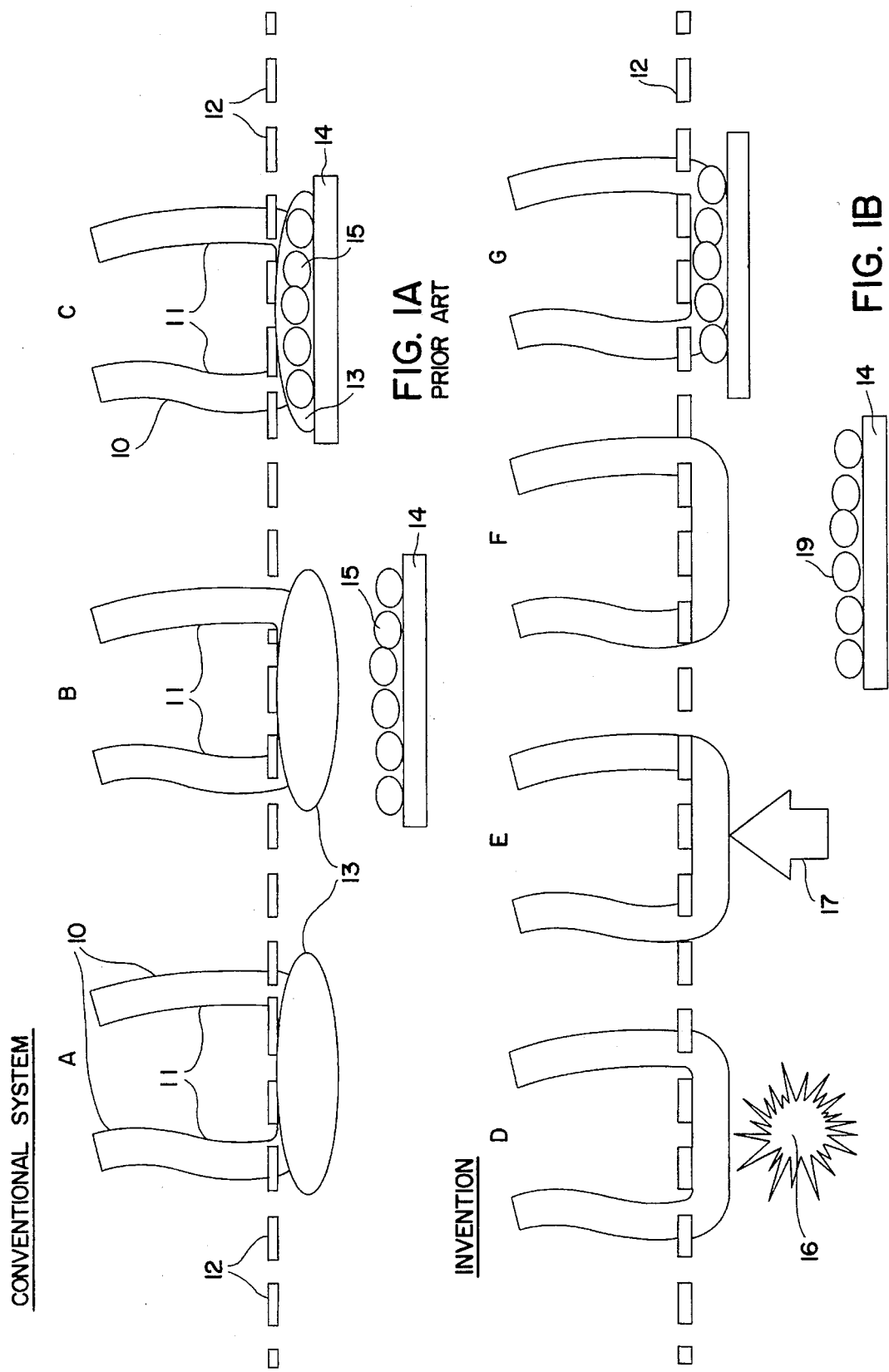

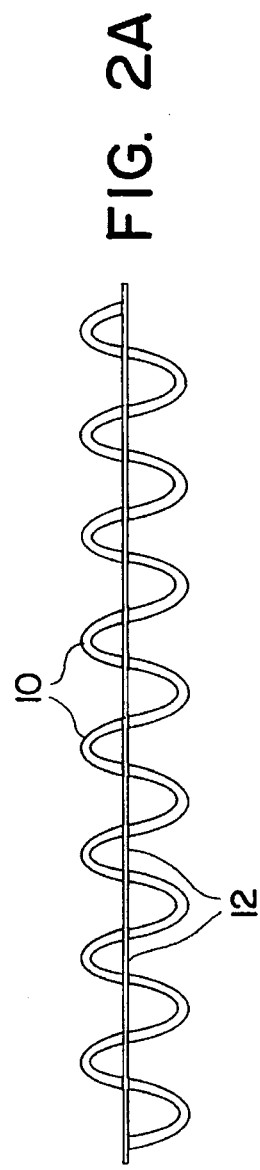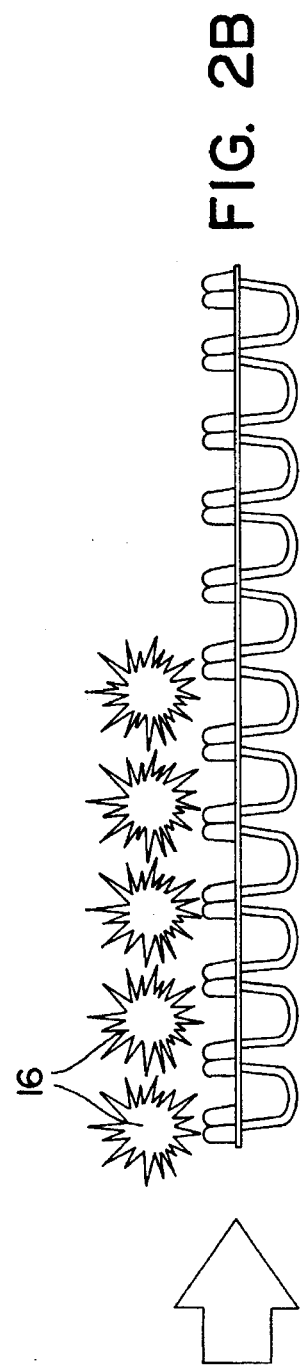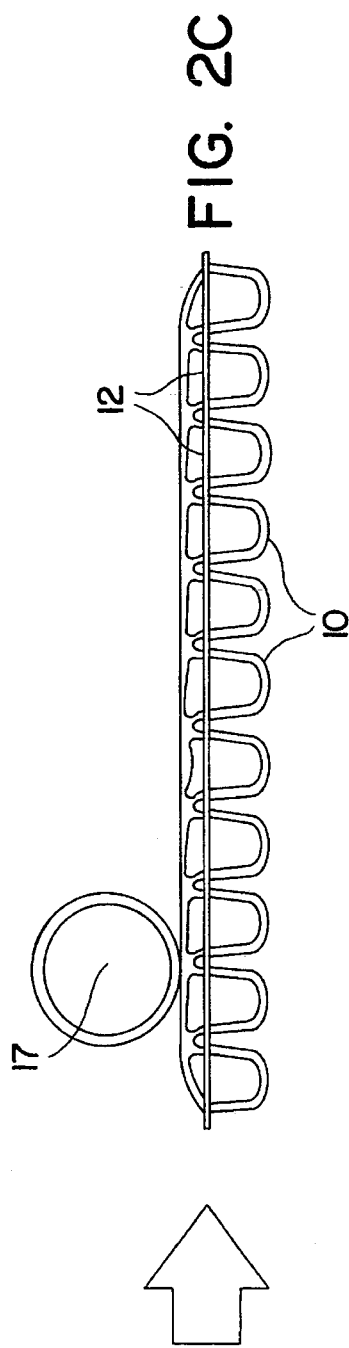

MANUFACTURING PROCESS FOR SYNTHETIC FIBER CARPETS FIXED BY FUSION AT REGULAR INTERVALS WITH CREST OR TUFTS, WITHOUT USING GLUES OR USING SMALL AMOUNTS OF GLUES, WHERE THREADS DO NOT LOOSEN AND THUS OBTAINING THE CARPETS

FIELD OF THE INVENTION

This invention involves carpets manufactured with looped or cut tufts, which require a very small amount of glue, or none at all, to stabilize the looped or cut tufts and avoid these from loosening from the support fabric when pulled vertically.

OBJECTIVES OF THE INVENTION

Consequently, the main objective of the invention is to fix the tufts, whether these have been cut or not, to the primary base and secondary base, eliminating the use of glues, or reducing such to a minimum use, without in any way affecting the fixing condition of the tuft and also improving the level of grasp of the tuft to the primary base.

Another objective of this invention is to, using the means provided, reduce production costs of said carpets and rugs.

Another objective of this invention is to provide for synthetic fiber carpets which are entirely recyclable thus reducing the amount of waste which is generated by old and discarded carpeting.

PRIOR ART

The manufacture of carpets, rugs and similar items by the looped system is known as "tufting" and is well known by experts in the art. In this process, the fibers which will form the pile face of the carpet are sewn into a thin base fabric (known as the primary base) in the form of continued tufts which may or may not be cut on the upper side of the base (i.e. the side not in contact with the floor). If the tufts are cut then one has cut tufts, if not then one has looped tufts, or looped pile. Meanwhile, the other side of the tuft, which is never cut and remains on the underside of the primary base, stays loose, and therefore can easily be removed from the primary base when the fibers of the tuft on the upper side are pulled, either by friction with part of a piece of furniture, a heel, or any rough object. Moreover, when a looped tuft is cut, the entire fiber of the line comes out, aggravating the situation. Of course, loosening of tufts would eventually lead to the gradual destruction of the carpet.

In order to avoid the above, and to stabilize the loose tufts (looped or cut), the conventional procedure followed in the industry has been to apply on the back of the primary base (after the fibers have been sewn on), a glue known in the art as "primary", which adheres the fibers to each other and, at the same time, to the primary base of the carpet, thereby stabilizing the tufts and no longer allowing the fibers to loosen from the base cloth when pulled.

Although this conventional system works adequately from a functional point of view, it is not sufficiently attractive from an economic point of view as the glue used is normally expensive and substantial quantities are required in manufacturing carpets. The glue is generally a mixture of styrenebutadiene with calcium carbonate, natural rubber, acrylic emulsions, polyvinyl alcohol emulsions, or any other appropriate glue. However, all these products are expensive and handling of some poses safety problems due to their high combustibility.

In the conventional system which we describe, a second layer of cloth known as the "secondary base" is added after applying the coating of primary glue to the aforementioned tufts. This secondary base is attached to the primary base by using a glue (known as "secondary glue") to seal the secondary base to the underside of the primary base and completely stabilize the carpet. This secondary base may be a natural jute, synthetic knit polyester cloth, nylon, polypropylene, etc., or any unwoven synthetic fiber cloths of different qualities. The secondary glue may be of the same type as the primary glue. The purpose of this secondary base is to reinforce the carpet in order that it may be dimensionally more stable and as an aesthetic element which hides the fibers on the underside which were impregnated with the primary glue.

SUMMARY OF THE INVENTION

Contrary to using the above described glue, our invention uses the fusion of the polymeric fibers on the underside of the primary base in order to stabilize the carpet. This is achieved by applying heat to said underside until the fibers located in the underside of the tuft are semi-melted or soft, thereby allowing the adhesion of the fibers with each other and with the primary base. Simultaneously with the semi-melting of the fibers, pressure is applied to the primary base which assures adhesion of the fibers to the primary base cloth. The second base is then applied, using a small amount of secondary glue, thus forming the carpet.

Pressure between the soft fibers and the primary base (and optionally the secondary base) is provided by a pressure roller which is kept cold through a water refrigeration system.

So far, it is evident that consumption of the glue in the invention has at least been reduced by 50% as it is only used to apply the secondary base. If desirable, this secondary glue may also be eliminated altogether by applying the secondary base simultaneously with the pressure already used to adhere the fibers when these are soft or semi-melted and in a very sticky condition. In this case, it will only be necessary to slightly modify the equipment to allow the secondary base to come into contact with the underside of the carpet and cover the primary base prior to the application of pressure. If one uses a primary and secondary base made of the same synthetic fiber making up the pile of the carpet and uses the adherence method described herein, one can achieve the outstanding ecological benefit of creating purely synthetic fiber carpets which can simply be melted as a whole and recycled as raw material. Polymeric fibers resulting after recycling carpets made by the present method have proven to be more than adequate for use in carpets again.

The term "glue" or "glued" as used herein, implies joining the elements by using a "glue" or a different and alien substance to the filaments, originating from outside the carpet. The term "adhere" or "adhered" as used herein, is reserved for the union of filaments between each other, or with the primary or secondary base, by means of the sticky condition of the semi-melted or soft filaments, and without the intervention of any element or substance other than the system of filaments and bases of the carpet.

It is evident that natural fibers such as cotton or wool, which are not affected in the fusion process through heating, cannot be used to produce the carpets of my invention, and therefore, the use of synthetic fibers such as nylon, rayons, polyethylene, polypropylenes, polyesters, etc. proves to be critical. These fibers are presently preferred in producing carpets.

IN THE DRAWINGS

Our invention will be more clearly appreciated by referring to the attached drawings, where, FIG. 1A shows a prior art conventional process;

FIG. 1B shows a process for making the present invention.

FIG. 2A, 2B and 2C schematically and sectionally shows the process of the invention for looped tufts;

FIG. 3 schematically shows the invention process in its entirety including the system allowing the secondary base to be adhered using fusion and pressure.

DETAILED DESCRIPTION OF THE INVENTION WITH REFERENCE TO THE DRAWINGS

Figure 3:
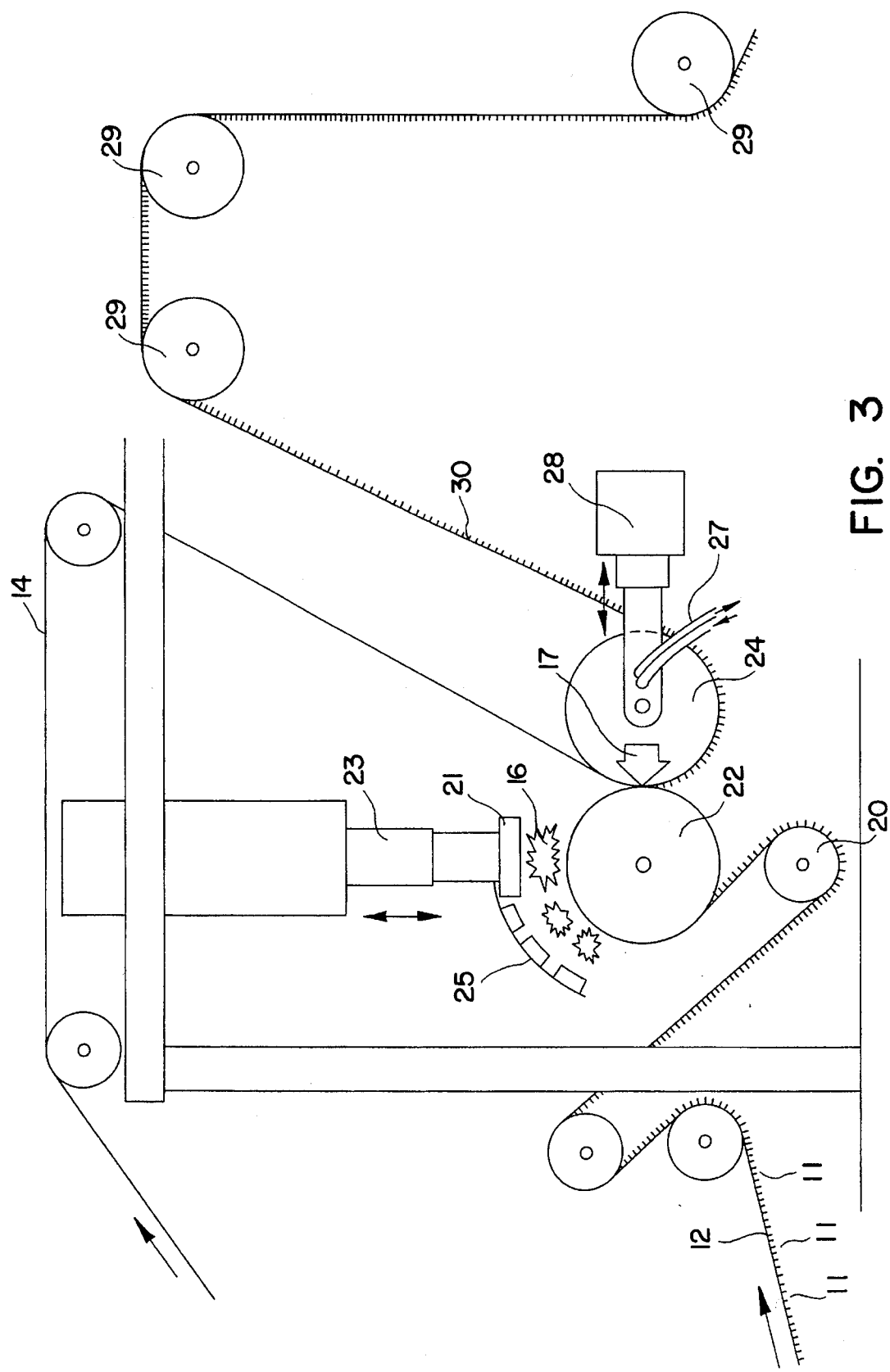

Referring to FIG. 1, we may appreciate that the fibers 10, which form the tufts 11, have been cut on the upper face of the carpet, above the primary base 12, leaving the ends of the tufts 11 loose on the upper side of the carpet. These loose ends form the tufting or pile of the carpet. However, we may easily appreciate that the fibers 10 may easily loosen from the primary base 12 since the underside of tufts 11 are not fixed. The same would occur in the case where the tufts were not cut, whereby a complete line would be formed by a single fiber which would extend from one edge to the other of the carpet, allowing the fiber of an entire line to loosen all at once if pulled.

In order to correct this inconvenience, the conventional system has traditionally used the method of applying a primary glue 13 on the underside of the tuft 11 (as shown in Step A of FIG. 1), in order to prevent it from coming loose through the upper side of the carpet. After applying the primary glue 13, the conventional system continues by applying the secondary base 14 with a coating of secondary glue 15 (as shown in Step B of FIG. 1), in such manner that the combination of fibers 10, primary base 12 and secondary base 14 is completely adhered to each other and stabilized, as shown in step C of FIG. 1.

The novel system herein described appears in the second row of FIG. 1 where, as one may appreciate in Step D, the primary glue 13 is absent since it is substituted by a heat source 16 which softens the fibers making up the underside of the tuft 11, and consequently, this underside is left in a semi-melted or soft condition. Subsequently, when applying pressure 17 against the underside of the primary base 12 the semi-melted or soft tufts 11 are adhered to each other and to the primary base 12 as shown in Step E. After this step, a coat of secondary glue 19 is applied to the secondary base 14, (as shown in Step F) whereby said secondary base 14 is glued to the underside of the tufts 11 previously adhered by fusion to the primary base 12 as shown in Step G.

So far, this has eliminated the use of 50% of the glue used in the conventional system, as the first phase of adherence to the primary base 12 has not required primary glue 13. In addition, it is also possible to eliminate the use of the secondary glue 19, by applying the secondary base 14 to the primary base 12 after the heat source 16 is applied but before pressure 17 is applied. In this manner, the semi-melted condition of the tufts not only permits adherence between themselves and the primary base, but also with the secondary base.

Through FIG. 2A, 2B and 2C we schematically and sectionally show the phases of manufacturing a conventional tuft of the looped carpet as taught by this invention. FIG. 2A shows a cross-sectional view of the looped tufts of the looped pile carpet where one may observe that the fiber 10 forms complete tufts 11 both on the upper side as well as on the underside of the primary base 12. FIG. 2B shows that the tufts 11 on the underside of the carpet being melted by a heat source 16, while FIG. 2C shows pressure 17 being applied by a roller, this pressure adhering the underside of tufts 11 to the primary base 12.

FIG. 3 schematically shows the entirety of the process. One may observe that the woven primary base 12 enters through the lower conducting roller 20 before entering the heating and pressure area. We initially used a felt singeing burner as a heat source 16 in the heating area, but later found that infrared lamps provided a more even and controllable heat source which gave better results. Other heating systems may of course be used instead, such as infrared lamps, inductive furnaces, electrical heating elements, etc. Thus, in our preferred embodiment, the heating area consists of a set of preheat infrared lamps 25, a main infrared lamp 21 and a support roller 22. Three preheat infrared lamps are used in the preferred embodiment of the present invention. However, more or less lamps may be used depending on how the speed of the process and the energy expenditure of the same is optimized. By using more lamps one can speed up the process since the carpet will reach the semi-melted condition in a shorter amount of time and thus permit the carpet to move faster through the merger area.

Control of the approximation of the heat source 16 to the primary base 12 is obtained by a piston 23, or any other positional mechanism, which can be regulated very finely for each type of carpet manufactured. Another purpose of this piston 23 is to pull the heat source 16 away from the carpet when there is a temporary halt in the process, in order that the heat source 16 does not destroy the primary base 12 when the process is stopped.

After passing the heating area, the woven primary base 12 enters the junction between the support roller 22 and pressure roller 24. At this point, being that the fibers making up the underside of the tufts 11 are still in a semi-melted and sticky condition, the secondary base 14 may be adhered to the primary base 12 by feeding it in from above, as shown in FIG. 3. As mentioned before, by doing this, one can take advantage of the semi-melted condition of the tufts to adhere the secondary base and thus eliminate the use of glues altogether.

The pressure roller 24 is refrigerated with a liquid cooling system 27 (we have used water as the liquid coolant) in order to sustain a maximum 30° C. temperature. Pressure roller 24 is also polished and chromed in order to provide for the best heat transfer possible. If necessary, support roller 22 may also be refrigerated with a liquid cooling system. The pressure roller's liquid cooling system 27 permits the material melted by the heat source 16 to quickly cool, thereby forming a plastic coating which adheres any remaining tufts 11 to the primary base 12 and, if desired, the secondary base 14. The melted and subsequently cooled tufts 11 thus become a homogenous coat which adheres all the fibers 10 to the primary base 12 (and optionally the secondary base 14) and thus substitutes the work of any glue. The pressure 17 provided by the pressure roller 24 is regulated by a hydraulic piston 28, or any other similar positioning device.

After leaving the merger area, the carpet 30 continues onto support rollers 29 to allow the carpet 30 to be cooled to room temperatures before being rolled.

ILLUSTRATIVE EXAMPLE OF OPERATING CONDITIONS AND RESULTS

The following equipment and operating conditions were used in order to successfully practice the foregoing invention on carpet using polyethylene/polypropylene fibers (10/90) having a loop pile of 550 g/m$^2$ (16 oz/yd$^2$) and a secondary base adhered by the present method:

1. Preheat Infrared Lamps (3):
   Manufactured by: REGOR (Colombia)
   Power: 10 kw each
   Average Temperature: 225° C. (measured at air/primary base interface)
2. Main Infrared Lamp:
   Manufactured by KRELUS (Swiss)
   Power: 16.5 kW
   Average Temperature: 275 ° C. (measured at air/primary base interface)
3. Average Pressure Exerted on Carpet by Pressure Roller 24: 80 psi.
4. Average Speed of Carpet: 217 cm/min A carpet with the following properties resulted:

1. Anchorage of an individual tuft: 3.0–3.5 kilograms.
2. Resistance to separation between primary and secondary base: secondary base failed before layers could be separated.
3. Abrasion Resistance: Using Taber Abraser with an H22 stone at 1000 g we obtained 2.6% abrasion at 2000 cycles and 3.4% abrasion at 3000 cycles.
4. Tear resistance of carpet remained over 50 Kg/in$^2$ in weave direction and was greater in perpendicular direction.
5. Eliminated the use of 1.122 Kg/m$^2$ of glue: styrenebutadiene/Ca CO$_3$ (Dow Chemical's Latex 93-00).

We have hereby described and shown the invention, not intending to limit the same to the specific phrasing and/or drawings included illustratively, but rather, in accordance to the attached claims.

What is claimed is:

1. A tufted carpet consisting essentially of:
   a base; and
   a plurality of tufts, each of said tufts having a looped portion on an underside of the base, each of said looped portions being fused to the underside of the base and to one or more adjacent looped portions using heat and pressure, thereby forming a homogeneous coat of the looped portions on the underside of the base.

2. The tufted carpet in accordance with claim 1, wherein the tufts are comprised of synthetic fibers selected from the group consisting of nylons, rayons, polyethylene, polypropylene, polyesters, and combinations thereof.

3. A tufted carpet consisting essentially of:
   a primary base;
   a plurality of tufts made from a synthetic fiber, each of said tufts having a looped portion on an underside of the base, each of said looped portions being fused to the underside of the base and to one or more adjacent looped portions using heat and pressure, thereby forming a homogeneous coat of the looped portions on the underside of the primary base; and
   a secondary base made from the same synthetic fiber as the tufts fused to the homogeneous coat of the looped portions on the underside of the primary base.

4. The tufted carpet in accordance with claim 3, wherein the tufts and the secondary base are comprised of synthetic fibers selected from the group consisting of nylons, rayons, polyethylene, propylene, polyesters, and combinations thereof.

\* \* \* \* \*